Dec. 2, 1969　　　L. G. ARNOLD ET AL　　　3,481,407
PLOW

Filed Sept. 15, 1966　　　　　　　　　　　　　　4 Sheets-Sheet 1

INVENTORS.
LOREN G. ARNOLD
JAMES F. SULLIVAN
HOWARD C. ESBECK
BY

ATTORNEY

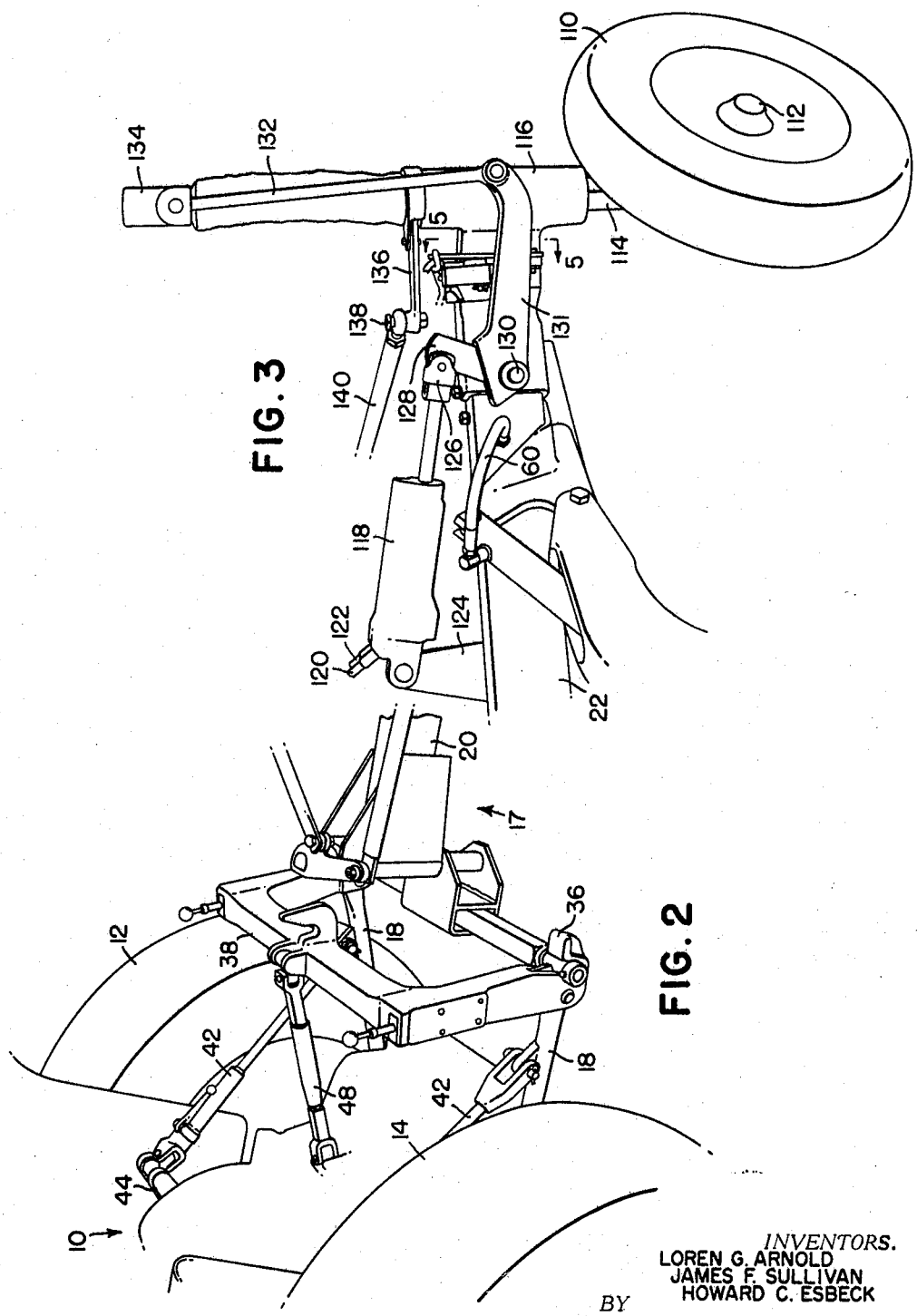

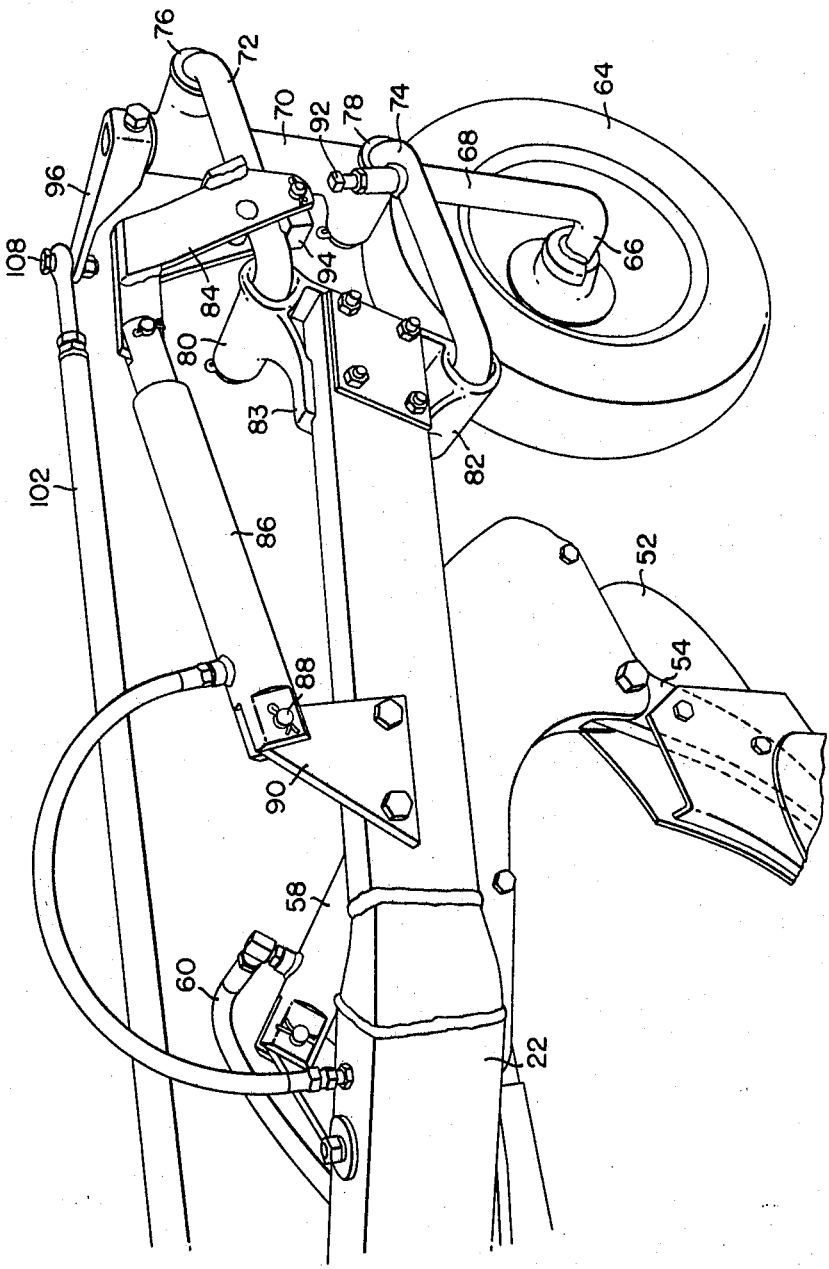

Dec. 2, 1969   L. G. ARNOLD ET AL   3,481,407
PLOW
Filed Sept. 15, 1966   4 Sheets-Sheet 4
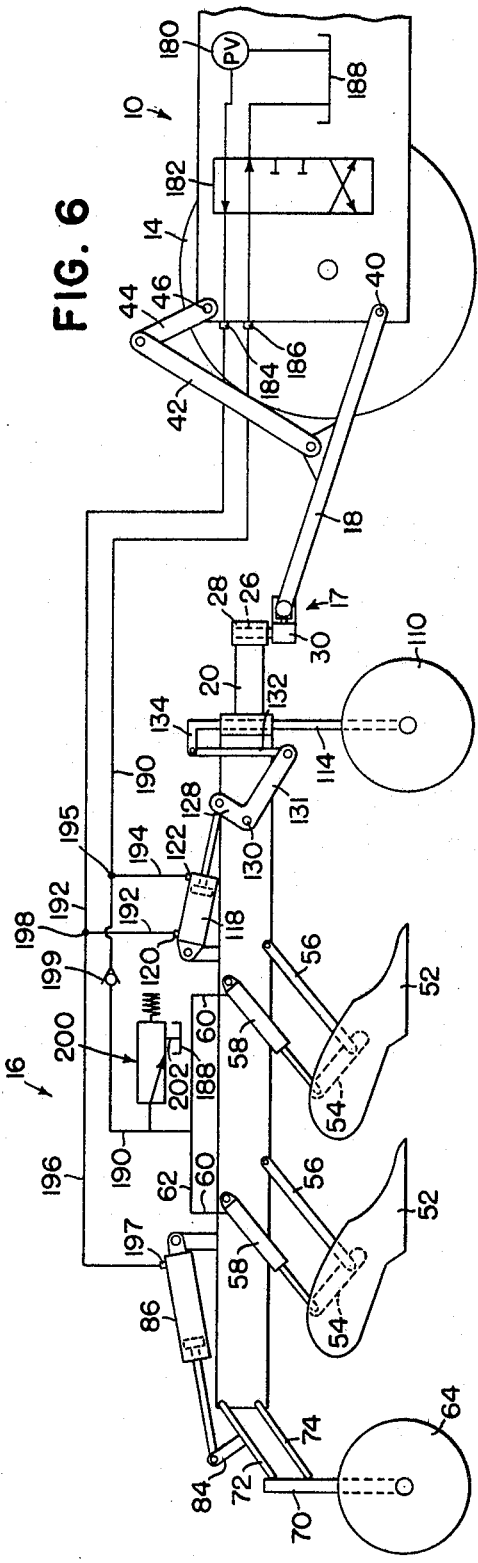
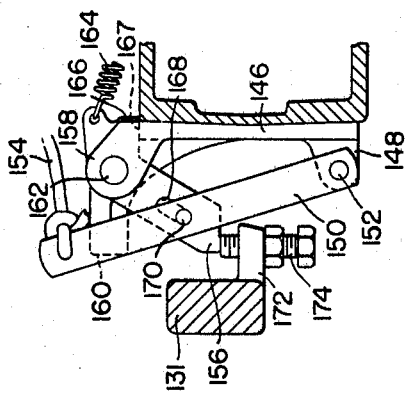
INVENTORS.
LOREN G. ARNOLD
JAMES F. SULLIVAN
HOWARD C. ESBECK
BY
*John C. Thompson*
ATTORNEY

United States Patent Office 3,481,407
Patented Dec. 2, 1969

3,481,407
PLOW
Loren Glenn Arnold, Rock Island, James Franklin Sullivan, East Moline, and Howard Christian Esbeck, Moline, Ill., assignors to Deere & Company, Moline, Ill., a corporation of Delaware
Filed Sept. 15, 1966, Ser. No. 579,652
Int. Cl. A01b 69/00
U.S. Cl. 172—285                               10 Claims

ABSTRACT OF THE DISCLOSURE

A semi-integral plow having front and rear vertically adjustable and steerable wheels, a plurality of bottoms held in their normal working position by hydraulic pressure, and a hydraulic control system utilizing a single valve and operative to raise the plow frame when in one condition and to maintain the plow bottoms in their normal working position when in another condition.

---

The present invention relates generally to agricultural implements and more particularly to semi-integral moldboard plows.

Semi-integral plows have in the past been provided with vertically movable front and rear wheels. It has also been known to provide a plow standard having hydraulic means to reset a plow after it has tripped.

One object of this invention is to provide a novel control system for a semi-integral moldboard plow having front and rear vertically movable wheels and a plurality of bottoms held in their normal working position by hydraulic means, the control means being operable to raise the frame of the plow relative to the ground when in one condition, and operable when in another condition to maintain the plow bottoms in their normal working position.

Another object of the present invention is to provide, in a semi-integral plow having vertically movable front and rear wheels, means to steer the front and rear wheels.

A further object of the present invention is to provide, in a semi-integral moldboard plow having vertically movable front and rear wheels, means to selectively limit the upward movement of the front wheel whereby the plow bottoms can be lowered further when opening a field.

A further object of the present invention is to provide, in a semi-integral plow having front and rear wheels, means to steer the forward wheel which will maintain a constant steering angle as the front wheel is moved vertically between transport, normal and opening positions.

These and other objects and advantages of this invention will be apparent to those skilled in the art after a consideration of the following detailed description, taken in conjunction with the accompanying drawings in which the preferred form of this invention is illustrated.

FIG. 2 is a perspective view of the plow shown in FIG. 1 taken from the rear and showing the manner in which it is secured to a tractor.

FIG. 3 is a detail of the front wheel assembly of the plow shown in FIGS. 1 and 2.

FIG. 4 is a detail of the rear wheel assembly shown in FIG. 1.

FIG. 5 is a section taken along the lines 5—5 in FIG. 3.

FIG. 6 is a simplified schematic side view of the plow secured to a tractor illustrating the manner in which the bottoms and the front and rear wheels are hydraulically controlled.

Figure 1:
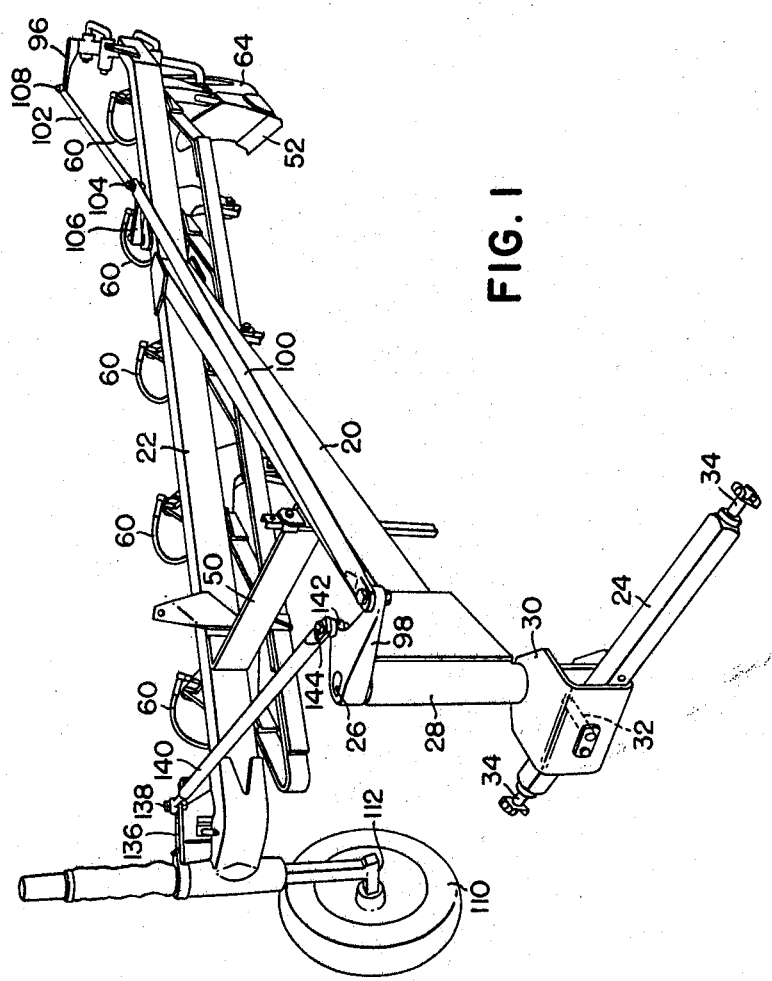
FIG. 1 is a perspective view taken from the front of a plow in which the principles of this invention have been incorporated.

In the following description right-hand and left-hand reference is determined by standing to the rear of the plow and facing the direction of travel.

Referring first to FIGS. 2 and 6, a farm tractor, indicated generally at 10 and having spaced apart right and left wheels 12 and 14, is shown to which a plow, indicated generally at 16, is secured by means of a forwardly extending hitch, indicated generally at 17. The hitch is secured at its forward end to the lower draft links 18 of the tractor. The hitch 17 includes a forwardly extending bar 20 which is rigidly secured at its rear end to the obliquely extending main frame 22. A crossbeam 24 is secured to the forward end of the hitch bar 20 by means of a vertically extending shaft 26 which is received within a sleeve 28 at the forward end of the bar 20. A housing 30 is carried at the lower end of the shaft 26 and the beam 24 is disposed within said housing and about a fore-and-aft extending pivot pin 32. Thus it should be noted that the crossbeam can rotate both about a normally vertically extending axis defined by the shaft 26 and also about a fore-and-aft extending axis defined by the pivot pin 32. The outer ends of the crossbeam 24 are reduced as at 34 and may be secured directly either to the apertured rear ends of the lower draft links 18 in the manner schematically shown in FIG. 6 or they may be received by the lower hooks 36 of a coupler 38.

As is conventional the lower draft links 18 are pivotally secured at their forward ends to a tractor at 40, an intermediate portion of the draft links being interconnected with lift arms 42 which in turn are secured to a rock arm 44 carried by a rock-shaft 46 on the tractor 10. When a coupler 38 is employed, its upper end is connected to the tractor by means of a compression link 48.

As previously noted the hitch bar 20 is secured to the main frame 22 of the plow rigidly at its rear end. Brace means 50 interconnect a forward portion of the frame 22 with an intermediate portion of the bar 20. A plurality of plow bottoms 52 is interconnected with the main frame 22, the interconnecting means including a standard 54 rigidly secured at its lower end to the bottom 52, a lower link 56 extending between the frame 22 and the standard 54 and pivotally secured at both ends to the standard 54 and the main frame 22, and an upper link pivotally secured at one end to the main frame 22 and also pivotally secured at its other end to the upper end of the standard 54, the upper link being in the form of an extensible and retractable hydraulic cylinder 58. The plow bottoms are normally held in their lower forward working position by means of fluid under pressure received within the cylinders 58 through lines 60 which are interconnected through a manifold 62. (While the manifold 62 is shown in FIG. 6 above the frame 22, in actual practice it is disposed within the frame.) Stops (not shown) limit the forward movement of the plows.

As can best be seen from FIG. 4, the rear end of the main frame 22 is supported by a rear furrow wheel 64 that is journaled for rotation on a stub axle 66 which in turn is carried at the lower end of a generally vertically extending shaft 68. An upper portion of the shaft 68 is rotatably received within a vertically extending sleeve portion in casting 70 which is carried for generally vertical movement by upper and lower parallel arms 72, 74, respectively. The front and rear ends of the arms 72 and 74 are disposed at right angles to the intermediate portion of the arms and are journaled within sleeves, the rear ends of arms 72 and 74 being disposed within horizontal sleeves 76 and 78 formed in the casting 70 and the forward ends of the arms 72 and 74 being disposed within horizontal sleeves 80 and 82 formed in a casting 83 secured to the rear end of the main frame 22. An upstanding arm 84 is rigidly secured at its lower end to an intermediate portion of the upper arm 72 and the arm 84 is pivotally secured at its upper forward end to a single-acting hydraulic cylinder 86 whose forward end is pivotally secured by means of a pivot pin 88 to a bracket 90 on the frame 22. Retraction and extension of the cylinder 86 will cause the wheel 64 to move upwardly and downwardly, the lower position being determined by the limit to which the cylinder 86 can extend and the upper position being determined by the adjustable stop 92 which contacts block 94. Mounted on the upper end of the shaft 68 is a crank arm 96. This arm is interconnected with a front steering arm 98 (FIG. 1) by means of longitudinally extending links 100 and 102 which are secured to each other through pivot pin 104 that is carried at one end of arm 106, the other end of the arm 106 being pivotally secured to the main frame 22 of the plow. The front steering arm 98 is non-rotatably secured to the shaft 26. To maintain the same steering angle of the rear furrow wheel 64 as it is moved between its raised working position and lowered transport position the stop is adjusted so that when the rear ends of the arms 72 and 74 are in their lower position the length between the pivot pin 108, which interconnects the link 102 with the arm 96, and the pin 104 is the same distance as when the rear ends of the arms 72 and 74 are in their upper working position.

A front furrow wheel 110 (FIG. 3) is rotatably carried on a stub axle 112 rigidly secured to a vertically extending square shaft 114. The shaft 114 is disposed for vertical movement within rotatable bearings in sleeve 116 which is carried by the forward end of the main frame 22. To control the vertical movement, a double-acting hydraulic cylinder 118 is provided, the cylinder having inlet and outlet ports 120 and 122. The anchor end of the cylinder 118 is pivotally secured to an anchor post 124 rigidly mounted on the frame 22. The remote end of the piston rod 126 is pivotally secured to a strap 128 which forms one arm of a bell crank pivotally secured at 130 to the frame of the plow. The other arm 131 of the crank is pivotally secured at its outer end to a vertically extending link 132, the upper end of which is pivotally secured to an outwardly extending arm 134 carried by the non-circular shaft 114.

A steering arm 136 is rigidly secured to the upper end of one of the bearings within the sleeve 116, the steering arm being pivotally secured at its outer end by means of pivot 138 to steering link 140, the other end of which is pivotally secured to a steering arm 142 by a pin 144, the arm 142 also being rigidly secured to the shaft 26. The bearing to which the steering arm 136 is secured is provided wit ha square aperture through which the shaft 114 slides. Therefore, when the arm 136 is caused to be moved, the wheel 110 will be steered.

It should be noted that by using the particular structure described above for moving the wheel 110 vertically that the length between the pins 138 and 144 remains constant, thus insuring the correct steering angle in all positions of vertical adjustment of the wheel 110.

It is another feature of this invention to provide a selectively operable stop which can contact the arm 131 of the bell crank to limit its movement in one direction. Thus it should be noted that when the cylinder 118 is extended the wheel 110 is disposed in its lower transport position. When the cylinder is retracted until the arm 131 engages the stop 156 shown in FIG. 5, the wheel 110 will then assume its normal ground-working position. When first plowing a field, since the wheel 110 will not have a previous furrow to run in, it is necessary that it be disposed at a higher position relative to the frame than when in the normal plowing position it would assume after one or two trips have been made through the field. To permit the wheel 110 to be moved to a raised first plowing (or opening) position, the stop 156 is moved to an inoperative position, permitting the cylinder 118 to retract further until the arm 131 contacts an abutment 160.

The stop construction includes a latch bracket 146 which is rigidly secured to the frame 22, the latch bracket 146 being provided with an outwardly extending apertured projection 148 at its lower end to which a strap 150 is pivotally secured by means of pivot pin 152. The upper end of the strap 150 is apertured and receives a rope 154 which extends to the operator's station on the tractor. A latch 156 is received between upper outwardly extending apertured abutments 158 and 160 and is pivotally secured thereto by means of pin 162. A tension spring 164 is secured at one end to an upper surface of the frame 22 and at the other end to an upper portion of the latch 156, the spring normally holding the lower end of the latch away from the frame 22 in such a position that an abutment portion 166 on an upper portion of the latch 156 will contact the upper end of the web 167 disposed between abutments 158 and 160. An elongated aperture 168 is provided in an intermediate portion of the latch 156 and receives a pin 170 carried by an intermediate portion of the strap 150. The arm 131 carries a projecting member 172 which is apertured and receives a stud 174, the upper end of which contacts the bottom of the latch 156 when in normal working position. However to move the wheel 110 into opening position it is only necessary to pull the string 154 which will cause the latch 156 to move towards the frame 22 permitting the stud and projection members 174 and 172 to pass the latch and thereby contact the abutment 160 which will dispose the wheel 110 in its opening position.

It should be noted from the preceding description that three hydraulic functions are required to operate the plow. Thus it is necessary to extend and retract the rear cylinder 86, it is necessary to extend and retract the forward cylinder 118, and it is also necessary to provide fluid under pressure to maintain the cylinders 58 in their extended position to hold the bottoms 52 in their lower forward working position. It is possible however to control all systems with a single valve in tractors having a closed center hydraulic system. Referring now to FIG. 6 in which a conventional farm tractor is illustrated, the tractor has a variable displacement pump 180, a closed center three-position control valve 182, and a pair of outlets 184 and 186 which are selectively connectible to the source of fluid under pressure 180 and to the fluid reservoir 188. (The variable displacement pump is preferably of the type shown in U.S. Patent 3,002,462 to Raymond issued Oct. 3, 1961.) According to the principles of this invention a first fluid line 190 is provided which interconnects one of the outlets 186 with the manifold 62. When the control valve 182 is disposed in such a position that the variable displacement pump 180 is connected to the outlet 186, the cylinders 58 will normally be extended to hold the bottoms 52 in their lower forward working position. A second fluid line 192 is provided which interconnects one of the ports 120 of the cylinder 118 with the other of said outlets 184. A third fluid line 194 interconnects the other port 122 of the cylinder 118 with the first fluid line 190 at juncture 195 and a fourth fluid line 196 interconnects the port 197 of the cylinder 86 with the line 192 at 198. A check valve 199 is disposed in the line 190 between the juncture 195 and the manifold 62. A relief valve, indicated generally at 200, is also provided, the relief valve being in fluid communication with the manifold and so located that it is downstream from the ball-check valve 199.

The operation of this hydraulic circuit is such that when the control valve is in the position illustrated in FIG. 6, fluid will flow from the pump 180 to the cylinders 86 and 118 causing these cylinders to be extended thereby raising the frame 22. The ball check 199 will prevent fluid from discharging from the cylinders 58 thereby maintaining the bottoms 52 in their desired position but fluid is permitted to flow through lines 194 and 190 from the other end of the cylinder 118 back to the reservoir 188. When the control valve 182 is moved to the other fluid transmitting position whereby fluid will then be delivered through outlet 186, the bottoms 52 will be held under pressure in their normal working position. (The fluid pressure within the cylinders may normally be in the neighborhood of 2200 pounds per square inch.) Should a bottom happen to strike an obstruction, the fluid pressure in the cylinders 58 will increase up to the predetermined relief pressure (which may be in the neighborhood of 2800 pounds), after which it will dump through relief valve 200 back to the reservoir 188. It is desirable to provide a separate line 202 to the reservoir. The ball check 199 ensures that the fluid will flow through the relief valve when an obstruction is encountered.

It should also be noted that when the pump 180 is in communication with outlet 186 that the cylinder 118 will be retracted until stud 174 carried on arm 131 either encounters latch 156 or abutment 160 and also that cylinder 86 will become retracted due to the weight of the plow.

Should a tractor of the type shown in FIG. 6 be provided with two pair of outlets, it is generally desirable to use the second pair of outlets to control the single-acting cylinder 86. Therefore the line 196 would be connected directly to one of the second pair of outlets instead of to the line 192 at 198. The other outlet of the second pair would not normally be used.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. The combination with a tractor having vertically movable draft links, a source of fluid pressure, a reservoir, and a pair of outlets connectible alternately to the source of fluid pressure and the reservoir through a closed center control valve of a semi-integral plow having a frame, means interconnecting said frame with said vertically movable draft links, a plurality of bottoms, means including first cylinder means interconnecting said bottoms with the frame and operable to normally hold said bottoms in a forward lower ground-working position but permitting movement of said bottoms to an upper rearward displaced position, wheel means supporting said frame, means including second cylinder means interconnecting said wheel means with said frame and operable upon extension of said cylinder to lower said wheel means relative to said frame, first fluid line means interconnecting said first cylinder means with one of said outlets whereby when said one outlet is interconnected with said source of fluid pressure, said bottoms will normally be held in their working position, and second fluid line means interconnecting said second cylinder means with the other of said pair of outlets whereby when said other outlet is interconnected with said source of fluid pressure, said wheel means will be lowered.

2. The combination set forth in claim 1 in which a check valve is disposed in said first fluid line and a relief valve is interconnected with said first fluid line between said first cylinder means and the check valve.

3. The combination with a tractor having vertically movable draft links, a source of fluid pressure including a variable displacement pump capable of supplying fluid under substantially constant pressure at varying rates upon demand, a reservoir, and a pair of outlets connectible alternately to the source of fluid pressure and the reservoir through a closed center control valve of a semi-integral plow having a frame, means interconnecting said frame with said vertically movable draft links, a plurality of bottoms, means including bottom cylinder means interconnecting said bottoms with the frame and operable to normally hold said bottom in a forward lower ground-working position but permitting movement of said bottoms to an upper rearward displaced position, means mounting front and rear wheels on the main frame for generally vertical movement between raised and lowered positions, said means including front and rear wheel cylinder means operable upon extension to lower the front and rear wheels relative to the frame, first fluid line means interconnecting said bottom cylinder means with one of said outlets whereby when said one outlet is interconnected with said source of fluid pressure said bottoms will normally be held in their working position, and second fluid line means interconnecting said front cylinder means with the other of said pair of outlets whereby when said other outlet is interconnected with said source of fluid pressure said front wheel means will be lowered.

4. The combination set forth in claim 3 in which the front cylinder is a double-acting cylinder having first and second ports, said second fluid line being connected with said first port, and third fluid line means interconnecting said second port with said first fluid line means.

5. The combination set forth in claim 4 in which a check valve is disposed in said first line, said third fluid line being interconnected with said first fluid line between said outlet and said check valve, and a relief valve is interconnected with said first fluid line between said bottom cylinder means and the check valve.

6. The combination set forth in claim 3 in which said rear cylinder means is interconnected with said second fluid line means.

7. The combination set forth in claim 3 further characterized by the provision of stop means mounted on the main frame and movable between operable and inoperable positions to selectively limit the upward movement of the front wheel whereby the bottoms may be disposed in either opening or normal working positions.

8. In an agricultural implement, a main frame extending obliquely to the direction in which the implement is adapted to travel, a plurality of earth-working tools mounted on the main frame, a forwardly extending hitch secured to the main frame intermediate the ends thereof, a generally vertically extending shaft journaled at the forward end of the hitch, a crossbeam secured to the lower end of the shaft and adapted to be interconnected with the lower draft links of a tractor three-point hitch, first crank arm means fixed to the upper end of the shaft and including two effective arms, one of the effective arms extending generally rearwardly and the other effective arm extending generally laterally in a direction away from the forward portion of the main beam, means mounting a steerable rear wheel to a rear portion of the main frame for generally vertical movement with respect to the main frame, second crank arm means operatively connected to and for steering the rear wheel, first link means interconnecting the other effective arm and the second crank arm means, means mounting a steerable front wheel to a front portion of the main frame for generally vertical movement with respect to the main frame, third crank arm means for steering the front wheel, means operatively connecting the third crank arm means to the front wheel and maintaining the third crank arm means in a fixed vertical position with respect to the main frame while permitting vertical movement of the front wheel with respect to the main frame, and second link means interconnecting the one effective arm with the third crank arm means.

9. The implement set forth in claim 8 wherein a support arm is pivotally mounted on the main frame for movement in a generally horizontal plane and extends in generally the same direction as the other effective arm, the first link means includes first and second links, the first link extends between the support arm and the other effective arm, and the second link extends between the support arm and the second crank arm means.

10. The implement set forth in claim 9 wherein the second crank arm means extends generally in a direction opposite from the direction which the other effective arm extends, and the third crank arm means extends generally in the same direction as the one effective arm, whereby turning movement of the cross-beam causes turning movement of the front steerable wheel in the same direction and turning movement of the rear wheel in the opposite direction.

References Cited

UNITED STATES PATENTS

| | | | |
|---|---|---|---|
| 1,186,441 | 6/1916 | Sanders | 172—282 |
| 1,301,628 | 4/1919 | Weaver | 172—284 X |
| 2,392,006 | 1/1946 | Silver | 172—401 |
| 3,228,484 | 1/1966 | Arnold et al. | 172—400 |

ROBERT E. PULFREY, Primary Examiner

R. C. HARRINGTON, Assistant Examiner

U.S. Cl. X.R.

172—288, 316, 400